(12) United States Patent
Ueda et al.

(10) Patent No.: US 7,973,810 B2
(45) Date of Patent: Jul. 5, 2011

(54) DISPLAY APPARATUS AND CELLULAR DEVICE

(75) Inventors: Kazunari Ueda, Yokohama (JP); Tomiyo Ema, Yokohama (JP)

(73) Assignee: Panasonic Corporation, Osaka (JP)

( * ) Notice: Subject to any disclaimer, the term of this patent is extended or adjusted under 35 U.S.C. 154(b) by 1251 days.

(21) Appl. No.: 10/497,507

(22) PCT Filed: Dec. 13, 2002

(86) PCT No.: PCT/JP02/13098
§ 371 (c)(1),
(2), (4) Date: Jun. 3, 2004

(87) PCT Pub. No.: WO03/052727
PCT Pub. Date: Jun. 26, 2003

(65) Prior Publication Data
US 2005/0083324 A1    Apr. 21, 2005

(30) Foreign Application Priority Data

Dec. 19, 2001   (JP) .............................. P. 2001-386271

(51) Int. Cl.
G09G 5/10   (2006.01)
G09G 5/00   (2006.01)
(52) U.S. Cl. ......... 345/691; 345/690; 345/210; 345/211
(58) Field of Classification Search .................. 345/211, 345/210, 690, 691; 713/300, 323, 320, 340
See application file for complete search history.

(56) References Cited

U.S. PATENT DOCUMENTS

| 3,938,138 | A | * | 2/1976 | Kojima et al. | 345/211 |
| 6,078,302 | A | * | 6/2000 | Suzuki | 345/77 |
| 6,445,376 | B2 | * | 9/2002 | Parrish | 345/156 |
| 6,697,059 | B2 | * | 2/2004 | Yamazaki | 345/211 |
| 6,900,798 | B2 | * | 5/2005 | Heie | 345/211 |
| 6,933,936 | B1 | * | 8/2005 | Hirai | 345/211 |

(Continued)

FOREIGN PATENT DOCUMENTS
EP    0 443 083 A2    8/1991
(Continued)

OTHER PUBLICATIONS

Notice of Reasons for Rejection (Office Action), dated Feb. 28, 2007.

*Primary Examiner* — Chante Harrison
(74) *Attorney, Agent, or Firm* — Pearne & Gordon LLP

(57) ABSTRACT

An object of the invention is to provide a display device that allows its useful life to be prolonged without letting the user of the device conscious of changes in the display state of the display device, and the power consumption to be prevented from increasing, and the usable time without charging to be prevented from being shortened even when a light emitting display device is used. The display device is driven by a power source chargeable by connection with an external power source and includes a display portion (4), a display control portion (31) that switches between an inverted display state and a non-inverted display state of said display portion (4), and a power source detection portion (5) that detects a connection with said external power source. The display control portion switches between the inverted display state and non-inverted display state of said display portion (4) when said power source detection portion (5) detects a connection with said external power source.

9 Claims, 4 Drawing Sheets

U.S. PATENT DOCUMENTS

2001/0032321 A1* 10/2001 Nanno et al. .................. 713/300
2005/0110717 A1* 5/2005 Iwamura .......................... 345/76

FOREIGN PATENT DOCUMENTS

| | | |
|---|---|---|
| EP | 1 094 438 A1 | 4/2001 |
| JP | 01-113682 A | 5/1989 |
| JP | 3-156491 A | 7/1991 |
| JP | 03-172909 A | 7/1991 |
| JP | 03-245180 A | 10/1991 |
| JP | 04-055923 A | 2/1992 |
| JP | 10-228010 A | 8/1998 |
| JP | 2002-207475 A | 7/2002 |
| WO | 01 22204 A1 | 3/2001 |

* cited by examiner

DISPLAY APPARATUS AND CELLULAR DEVICE

TECHNICAL FIELD

The present invention relates to a display device used in a portable device and driven by a chargeable power source.

BACKGROUND ART

There has been a demand for portable devices such as a mobile telephone having smaller size, and displays for the devices should be reduced in size as well. This is why light emitting type displays such as organic EL devices that can be thinned have come to be used more than conventional LCDs that have been used for the displays.

The display for a mobile telephone has a part indicating the state of the telephone such as the remaining talk time and the field intensity. This state indicating part shows fixed patterns and therefore has its characteristics such as luminance more degraded than the other part, which results in so-called "image burn." In order to solve this problem, non-inverted display and inverted display may regularly be switched, but such switching occurring in the use of the device might not only irritate the user, but also could be mistaken as the sign of a failure.

When a light emitting display device is used for the display of a mobile telephone and inverted display is carried out, the power consumption increases, and the usable time without charging is shortened.

The present invention is directed to a solution to the above problems, and it is an object of the invention to prolong the useful life of a display device without letting the user of the device conscious of changes in the display state of the display device. Another object of the invention is to prevent the power consumption from increasing, and the usable time without charging from being shortened even when a light emitting display device is used.

DISCLOSURE OF THE INVENTION

A display device according to the invention is driven by a power source chargeable by connection with an external power source and includes a display portion, a display control portion capable of switching between an inverted display state and a non-inverted display state of said display portion, and a power source detection portion that detects a connection with said external power source. The display control portion switches between the inverted display state and non-inverted display state of said display portion in response to the connection detected by said power source detection portion. In this way, since the display is switched when the device is connected with an external power source, image burn in the display portion can be prevented. The power consumption in the display portion when the device is connected with the external power source does not have to be taken into account, and the usable time without charging is not reduced. In addition, the display is inverted when the device is connected with the external power source rather than when the device is used in a normal state, and therefore the user is less likely to mistake the inversion as the sign of a failure.

The display device according to the invention includes a display adjusting portion that adjusts the luminance of said display portion. The display adjusting portion adjusts the luminance of said display portion in an inverted display state or a non-inverted display state. Since the luminance of the display portion is adjusted based on the display state, disparity in the characteristic of the display device can be reduced and image burn can be prevented.

The display device according to the invention further includes a time measuring portion that measures the display time of said display portion. Said display adjusting portion adjusts the luminance of said display portion based on the display time measured by said time measuring portion. The display time is measured by said time measuring portion and the luminance of the display portion is adjusted based on the display time. In this way, disparity in the characteristic in the display device can strictly be restrained, and the degree of image burn can be minimized.

A portable device according to the invention includes the above described display device.

Figure 1:
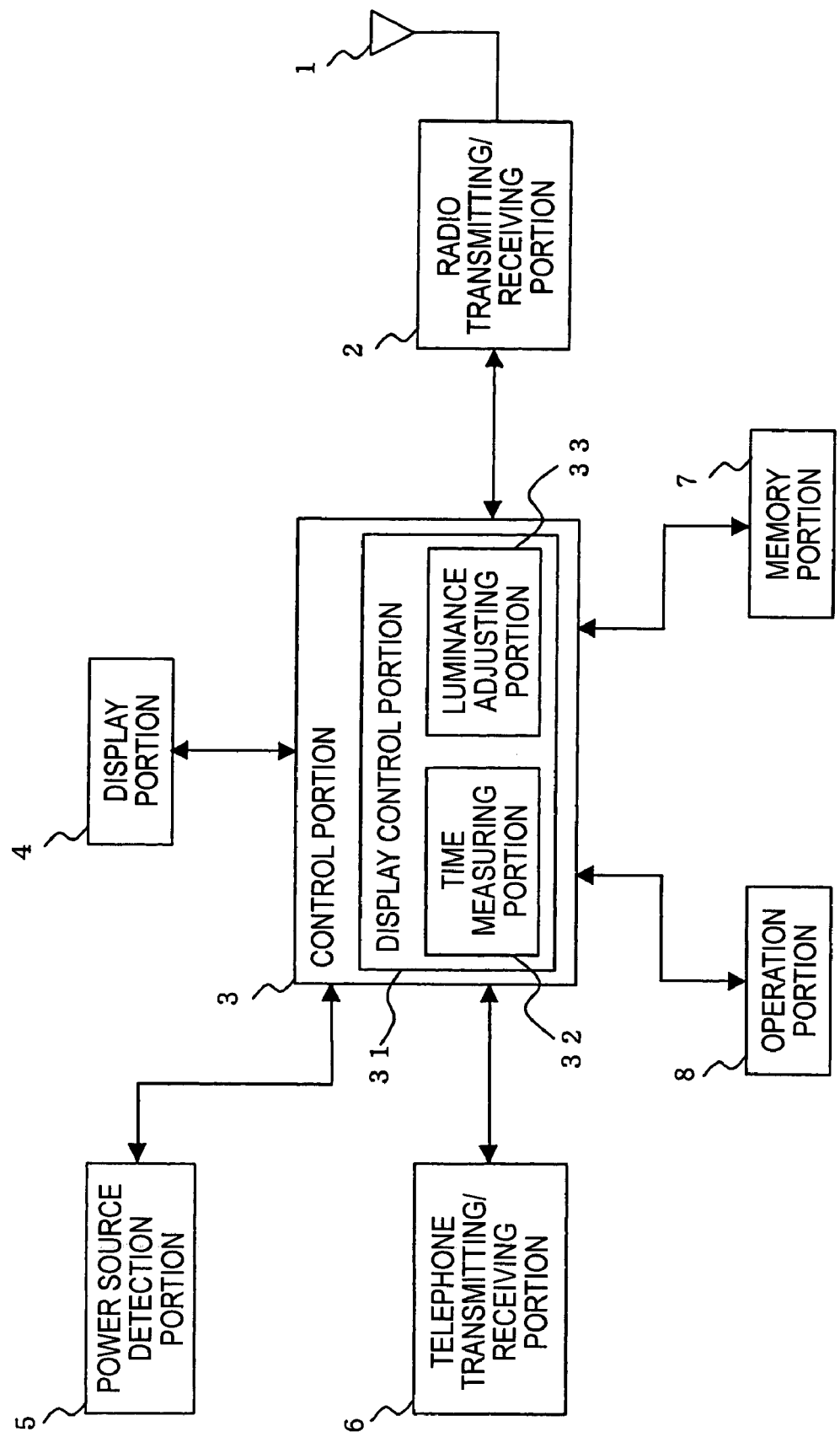
FIG. 1 is a diagram of the configuration of a mobile telephone including a display device according to an embodiment of the invention.

Note that in the drawings, a reference numeral 1 refers to an antenna, 2 to a transmitting/receiving portion, 3 to a control portion, 31 to a display control portion, 32 to a time measuring portion, 33 to a luminance adjusting portion, 4 a to display portion, 5 to a power source detection portion, 6 to a telephone transmitting/receiving portion, 7 to a memory portion, 8 to an operation portion, 110 to an indication showing the remaining capacity of a battery in a normal display (non-inverted display) state, 111 to an indication showing reception of a mail message in the normal display (non-inverted display) state, 112 to an indication showing the field intensity in the normal display (non-inverted display) state, 113 to an indication showing the date in the normal display (non-inverted display) state, 210 to an indication showing the remaining capacity of the battery in an inverted display state, 211 to an indication showing reception of a mail message in the inverted display state, 212 to an indication showing the field intensity in the inverted display state, and 213 to an indication showing the date in the inverted display state.

BEST MODE FOR CARRYING OUT THE INVENTION

Now, an embodiment of the invention will be described in conjunction with FIGS. 1 to 4. FIG. 1 is a schematic diagram of the configuration of a mobile telephone including a display device according to the embodiment of the invention. The mobile telephone includes an antenna 1, a radio transmitting/receiving portion 2, a control portion 3, a display portion 4, a power source detection portion 5, a telephone transmitting/receiving circuit 6, a memory portion 7, and an operation portion 8. The antenna 1 transmits/receives electric waves between the mobile telephone and a base station, and the radio transmitting/receiving portion 2 carries out operations such as amplification of the transmission/received waves and conversion of the frequency of the waves.

The control portion 3 controls the operation of each of portions such as the radio transmitting/receiving portion 2, the display portion 4, and the power source detection portion 5 or the operation as a whole. The control portion 3 includes a display control portion 31 to control the display portion 4. The display control portion 31 further includes a luminance adjusting portion 33 and a time measuring portion 32. The luminance adjusting portion 32 adjusts the luminance of the display portion 4 in a normal display (hereinafter also referred to as "non-inverted display") state or in an inverted display state. The time measuring portion 33 measures the non-inverted display period or the inverted display period by the display portion 4.

Figure 2:
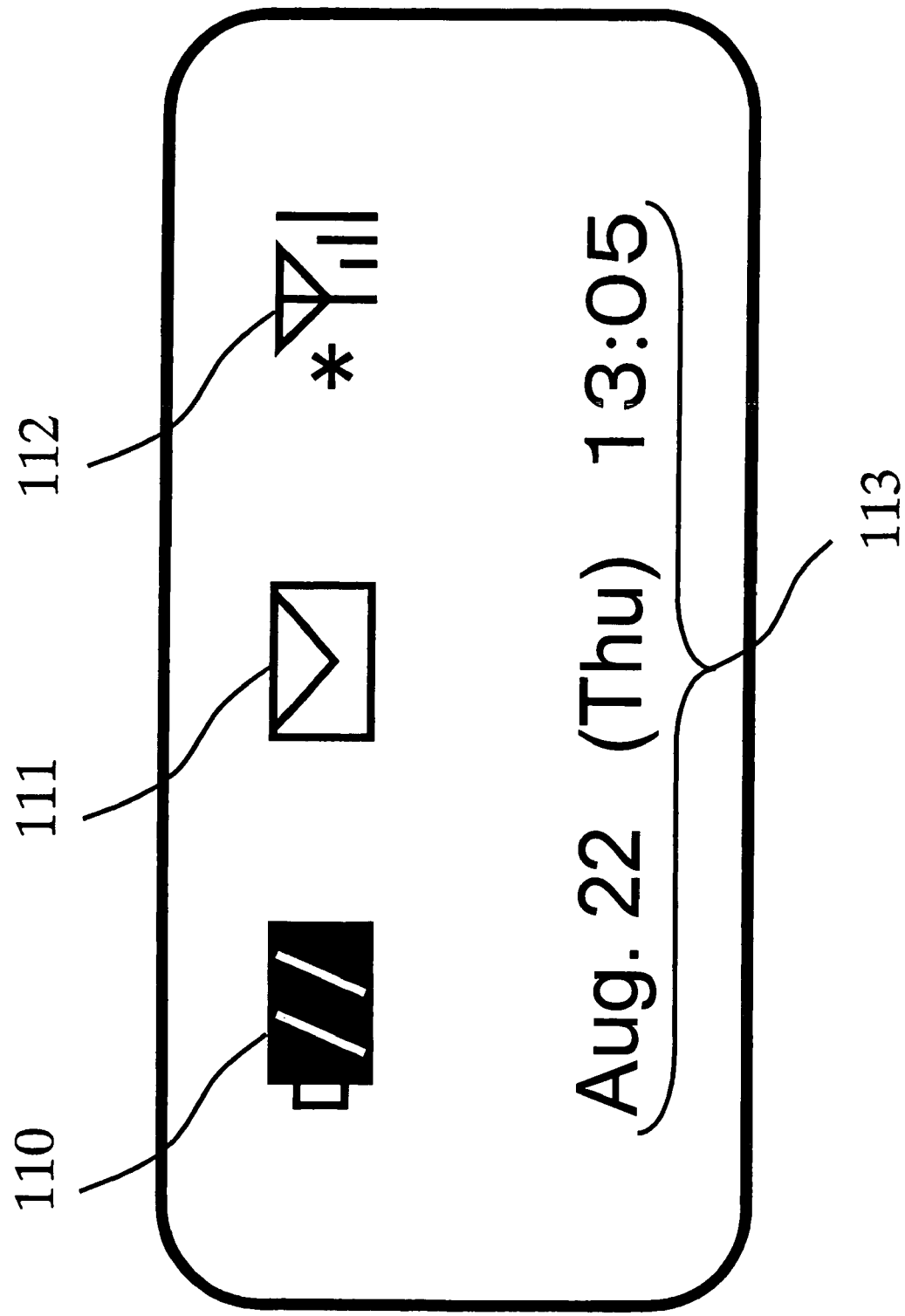
FIG. 2 is a view of an example of the display screen of the display device in a non-inverted display state according to the embodiment of the invention.

The display portion 4 is a light receiving type display portion made of for example an LCD (liquid crystal display) or a light emitting type display portion made of for example an organic EL (electro-luminescent) device. The display portion 4 has a portion as shown in FIG. 2 that indicates the state of the mobile telephone such as the remaining capacity of the battery and the field intensity, and the state indicating part includes fixed patterns of a battery, an antenna and the like. The luminance of the display portion 4 in the non-inverted display state is adjusted to a readily visible level.

The power source detection portion 5 detects the connection state with an external power source including charging and non-charging states. The telephone transmitting/receiving circuit portion 6 transmits/receives voice sound, the memory portion 7 stores data necessary for operating the mobile telephone, and the operation portion 8 serves as a man-machine interface for example for key operation.

Figure 3:
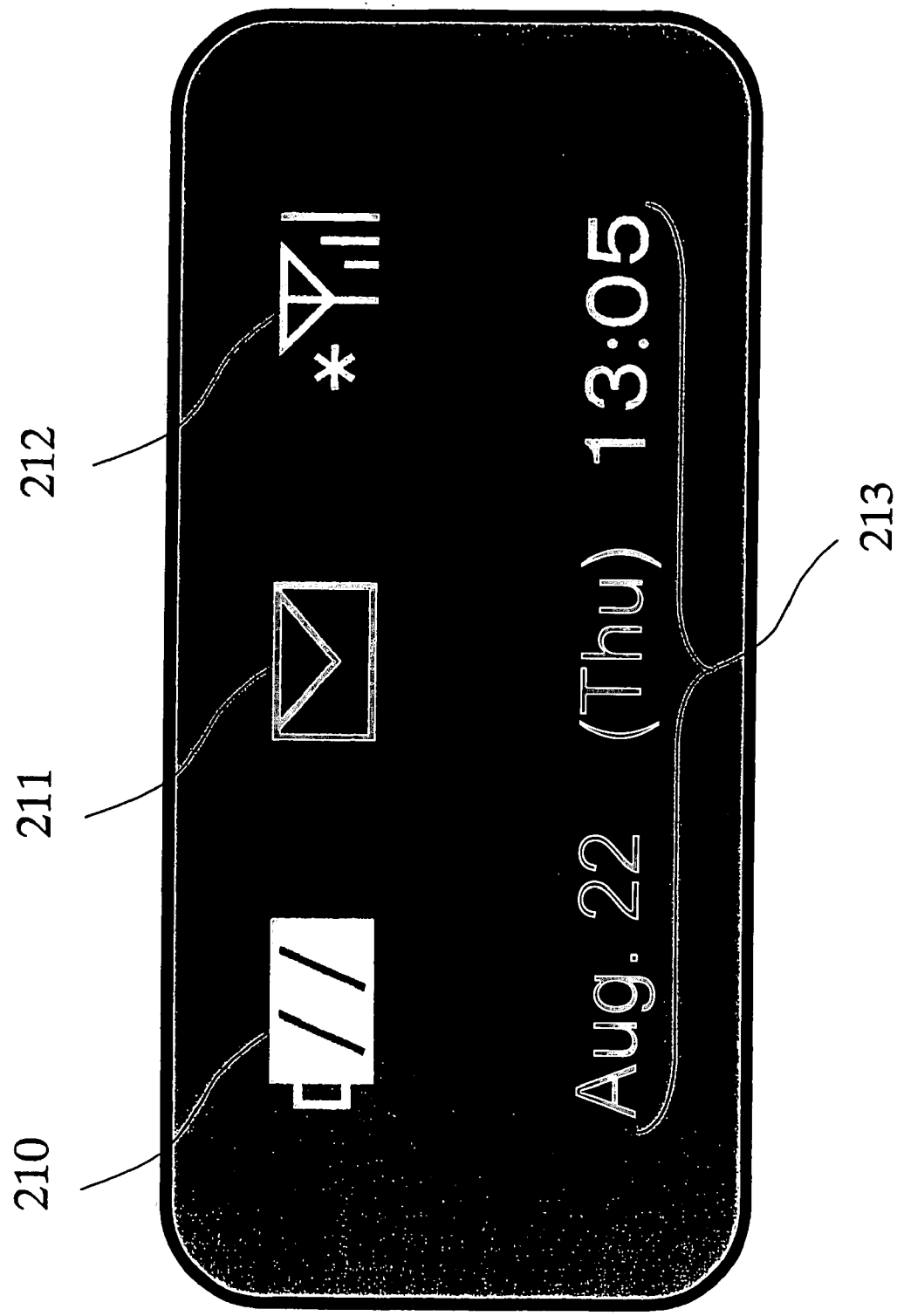
FIG. 3 is a view of an example of the display screen of the display device in an inverted display state according to the embodiment of the invention.

Now, how the display control portion 3 controls the display portion 4 to operate will be described. When the mobile telephone is used for communication or Internet connection with no connection to an external power source, the display portion 4 displays communication assisting information or transmission/reception information through the Internet. As shown in FIG. 2, the state indicating part displays, in a non-inverted display state, for example fixed patterns of a battery, an antenna, etc. indicating the remaining capacity of the battery 110 and the field intensity 112. The use of the mobile telephone reduces the remaining capacity of the battery. When the user connects the telephone with an external power source for charging, the display control portion 31 switches the display of the display portion 4 from the non-inverted display in FIG. 2 to an inverted display as shown in FIG. 3 based on the connection state detected by the power source detection portion 5.

Now, a method of adjusting the luminance of the display portion 4 in the inverted display state will be described. The display adjusting portion 33 sets the luminance of the display portion 4 in the inverted display state as follows. Based on the average period for using the mobile telephone without connection with the external power source, the average charging time, and the adjusted luminance in the non-inverted display state, the luminance in the inverted display state is set, so that there is no disparity in the characteristic of the display device after the device is degraded by using.

The luminance in the inverted display state may be adjusted based on the state of how the display portion 4 is used. Now, a method of adjusting the luminance in the case will be described. The time measuring portion 32 measures the period of the non-inverted display state of the display portion 4 and includes a counter (not shown) that is incremented in the non-inverted display state and is decremented in the inverted display state. The counter is incremented for every prescribed time period in the non-inverted display state and is decremented for each time period corresponding to the luminance in the non-inverted display state. The luminance adjusting portion 33 sets the luminance in the inverted display state depending on the value of the counter when the non-inverted display is switched to the inverted display. The luminance set in the inverted display state is set to such a value that there is no disparity in the characteristic in the display device as described above.

Figure 4:
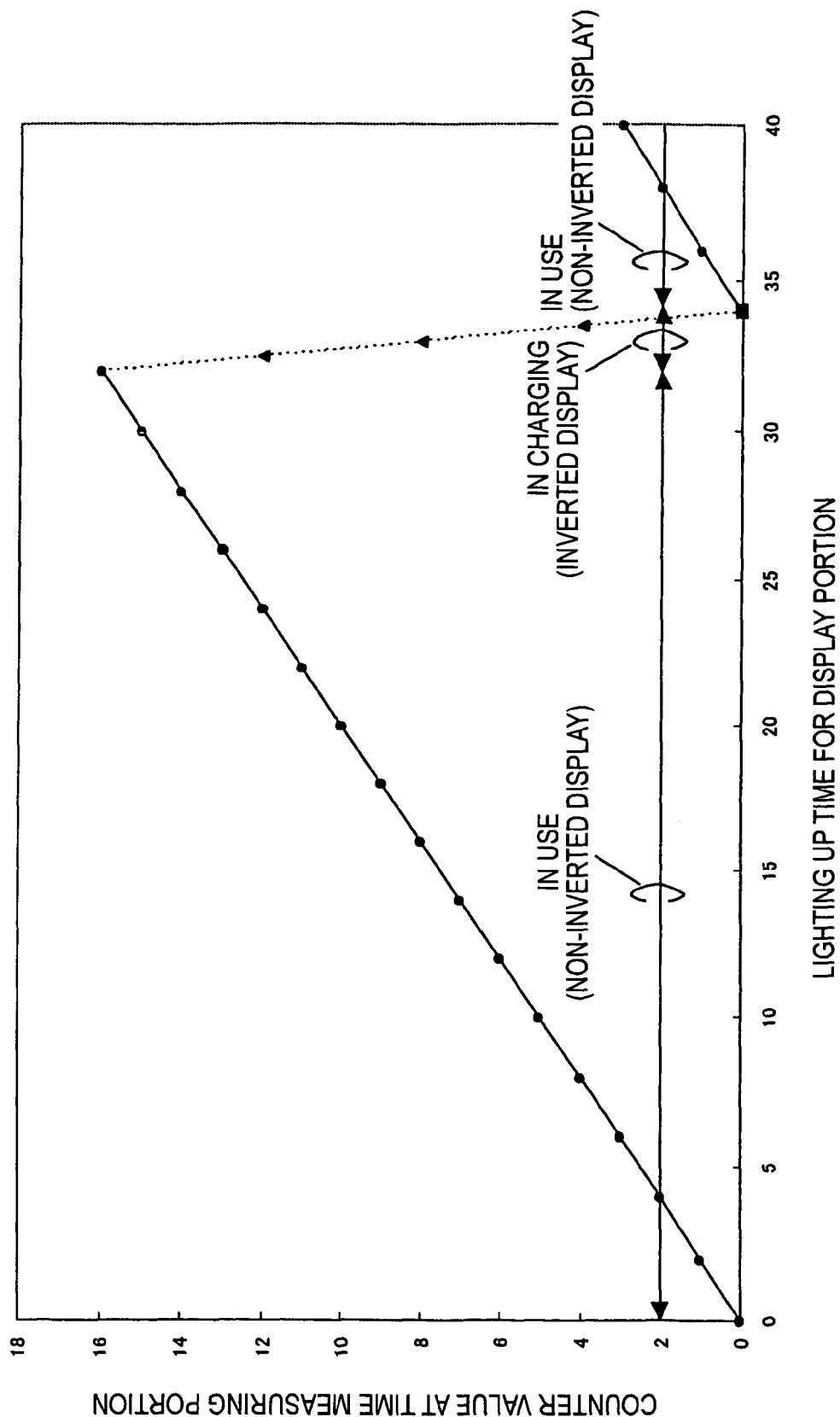
FIG. 4 is a graph showing an example of the state of the counter of a time measuring portion according to the embodiment of the invention.

An example of the state of the counter in this case is shown in FIG. 4. The counter is incremented at a time interval based on the display luminance, by one for every two hours in the example shown in FIG. 4, until the power source detection portion 5 detects a connection with the external power source. When the luminance is variable in the non-inverted display state, the time interval changes based on the display luminance. For example, in the example in FIG. 4, when the luminance in the non-inverted display state doubles, the counter is incremented by one for every hour.

When the remaining capacity of the battery is reduced as the mobile telephone is used, and the user connects the device to the external power source for charging, the power source detection portion 5 detects the connection with the external power source, and the display control portion 31 switches the display portion 4 from the non-inverted display state to the inverted display state. The counter is decremented at the time interval corresponding to the luminance in the inverted display state, i.e., at such a time interval that the counter value incremented for the non-inverted display period reaches zero at the end of the average charging time. In this example, the average charging time is two hours, the count value at the start of charging is 16, and therefore the counter value is decremented at the interval according to which the counter counts 16 times for two hours, i.e., by eight for every hour. After the end of charging, the counter resumes incrementing by one for every two hours.

Note that in the example in FIG. 4, the charging ends at the end of the average charging period, and therefore the counter resumes incrementing from the counter value that equals zero, but the counter does not necessarily resume incrementing from the zero value. For example, when the battery power consumption is small and charging is carried out, or when the user disconnects the device from the external power source before the device is fully charged, the counter resumes incrementing before its zero value is attained. When the battery power consumption is very large, charging does not end even when the counter value is zero and the counter resumes incrementing from a negative counter value. As can be understood from the foregoing, the counter value shows disparity in the characteristic in the display device.

A plurality of such display portions 4 according to the embodiment of the invention may be provided as those of a folding type mobile telephone. Light receiving and emitting display portions may be combined in various manners when a plurality of such display portions are formed.

In addition, the switching of the display portion 4 described in connection with the above embodiment of the invention may be carried out by the display control portion 31 to switch from the inverted display to the non-inverted display when the power source detection portion 5 detects a connection with an external power source.

In addition, the connection state according to the embodiment of the invention described above may include a state in which the device is connected with an external power source but not being charged.

Although the present invention has been described in detail by referring to the particular embodiment, it is clearly understood by those skilled in the art that various changes and modifications can be made without departing from the spirit and scope of the invention.

This application is based on Japanese Patent Application No. 2001-386271 filed on Dec. 19, 2001, the teachings of which are incorporated herein by reference.

INDUSTRIAL APPLICABILITY

As in the foregoing, according to the invention, the display state of the display device is inverted when the device is connected with an external power source including the charging state, so that there is no disparity in the characteristic between the part displaying states such as the remaining battery capacity and the field intensity, and the other part. In this way, image burn can be prevented, and the useful life of the display device can be prolonged while the user of the device is not conscious of changes in the display state of the device. In addition, according to the invention, the display state of the display device is inverted during charging, so that the power consumption in the normal use is not increased, and the usable period without charging can be prevented from being shortened. Furthermore, according to the invention, the connection state with the external power source indicating whether or not the device is in a charging state can clearly be known based on the display state of the display portion such as the inverted and non-inverted display states.

The invention claimed is:

1. A display device driven by a power source chargeable by connection with an external power source, comprising:
   a display portion;
   a power source detection portion that detects a connection state of the power source with the external power source;
   a display control portion that switches between an inverted display state and a non-inverted display state of the display portion in accordance with the connection state detected by the power source detection portion;
   a time measuring portion that measures a display time of the display portion in a state that the power source is not in connection with the external power source; and
   a display adjusting portion that adjusts luminance of the display portion in a state that the power source is in connection with the external power source in accordance with the display time measured by the time measuring portion.

2. The display device according to claim 1, wherein the display adjusting portion adjusts the luminance of the display portion so that the luminance becomes high in the state that the power source is in connection with the external power source in accordance with increase of the display time measured by the time measuring portion.

3. A display device driven by a power source chargeable by connection with an external power source, comprising:
   a display portion;
   a power source detection portion that detects a connection state of the power source with the external power source;
   a display control portion that switches to an inverted display state of the display portion from a non-inverted display state of the display portion when the power source detection portion detects that the power source is in connection with the external power source;
   a time measuring portion that measures a display time of the display portion in a state that the power source is not in connection with the external power source; and
   a display adjusting portion that adjusts luminance of the display portion in a state that the power source is in connection with the external power source in accordance with the display time measured by the time measuring portion.

4. The display device according to claim 3, wherein the display adjusting portion adjusts the luminance of the display portion so that the luminance becomes high in the state that the power source is in connection with the external power source in accordance with increase of the display time measured by the time measuring portion.

5. A display device driven by a power source chargeable by connection with an external power source, comprising:
   a display portion;
   a power source detection portion that detects a connection state of the power source with the external power source;
   a display control portion that switches to a non-inverted display state of the display portion from an inverted display state of the display portion when the power source detection portion detects that the power source is in connection with the external power source;
   a time measuring portion that measures a display time of the display portion in a state that the power source is not in connection with the external power source; and
   a display adjusting portion that adjusts luminance of the display portion in a state that the power source is in connection with the external power source in accordance with the display time measured by the time measuring portion.

6. The display device according to claim 5, wherein the display adjusting portion adjusts the luminance of the display portion so that the luminance becomes high in the state that the power source is in connection with the external power source in accordance with increase of the display time measured by the time measuring portion.

7. A portable device comprising:
   the display device according to claim 1.

8. A portable device comprising:
   the display device according to claim 3.

9. A portable device comprising:
   the display device according to claim 5.

* * * * *